United States Patent [19]

Heister et al.

[11] Patent Number: 5,014,130
[45] Date of Patent: May 7, 1991

[54] SIGNAL LEVEL CONTROL CIRCUIT HAVING ALTERNATELY SWITCHED CAPACITORS IN THE FEEDBACK BRANCH

[75] Inventors: Heinz Heister, Karlsruhe; Wolfango Jann, Buckenhof, both of Fed. Rep. of Germany

[73] Assignee: Siemens Aktiengesellschaft, Berlin & Munich, Fed. Rep. of Germany

[21] Appl. No.: 557,532

[22] Filed: Jul. 24, 1990

[30] Foreign Application Priority Data

Jul. 31, 1989 [DE] Fed. Rep. of Germany ....... 3925329

[51] Int. Cl.$^5$ .............................................. H04N 5/18
[52] U.S. Cl. ..................................... 358/173; 358/34; 358/171; 358/174
[58] Field of Search ............... 358/168, 170, 171, 172, 358/173, 34, 174, 178

[56] References Cited

U.S. PATENT DOCUMENTS

| | | | |
|---|---|---|---|
| 4,296,437 | 10/1981 | Geurts | 358/173 |
| 4,516,042 | 5/1985 | Nakamura | 358/172 X |
| 4,549,214 | 10/1985 | Hinn | 358/172 |
| 4,797,744 | 1/1989 | Klemmer et al. | 358/34 X |
| 4,811,087 | 3/1989 | Engel et al. | 358/172 X |
| 4,811,101 | 3/1989 | Yagi | 358/171 |
| 4,884,141 | 11/1989 | Hyakutake | 358/174 |
| 4,963,969 | 10/1990 | Kitaura et al. | 358/174 |

Primary Examiner—James J. Groody
Assistant Examiner—Mark R. Powell
Attorney, Agent, or Firm—Kenyon & Kenyon

[57] ABSTRACT

A circuit for controlling the amplitude of video signals includes a control circuit which contains a first capacitor. For each image pulse, a charge which corresponds to the amplitude of the generated video signal during a prior frame cycle is stored in the first capacitor. During the frame flyback pulse, this charge is transferred to a second capacitor by means of a switch. The second capacitor's voltage serves as a control voltage for the video signal. After the charge is transferred to the second capacitor, the first capacitor is discharged.

4 Claims, 1 Drawing Sheet

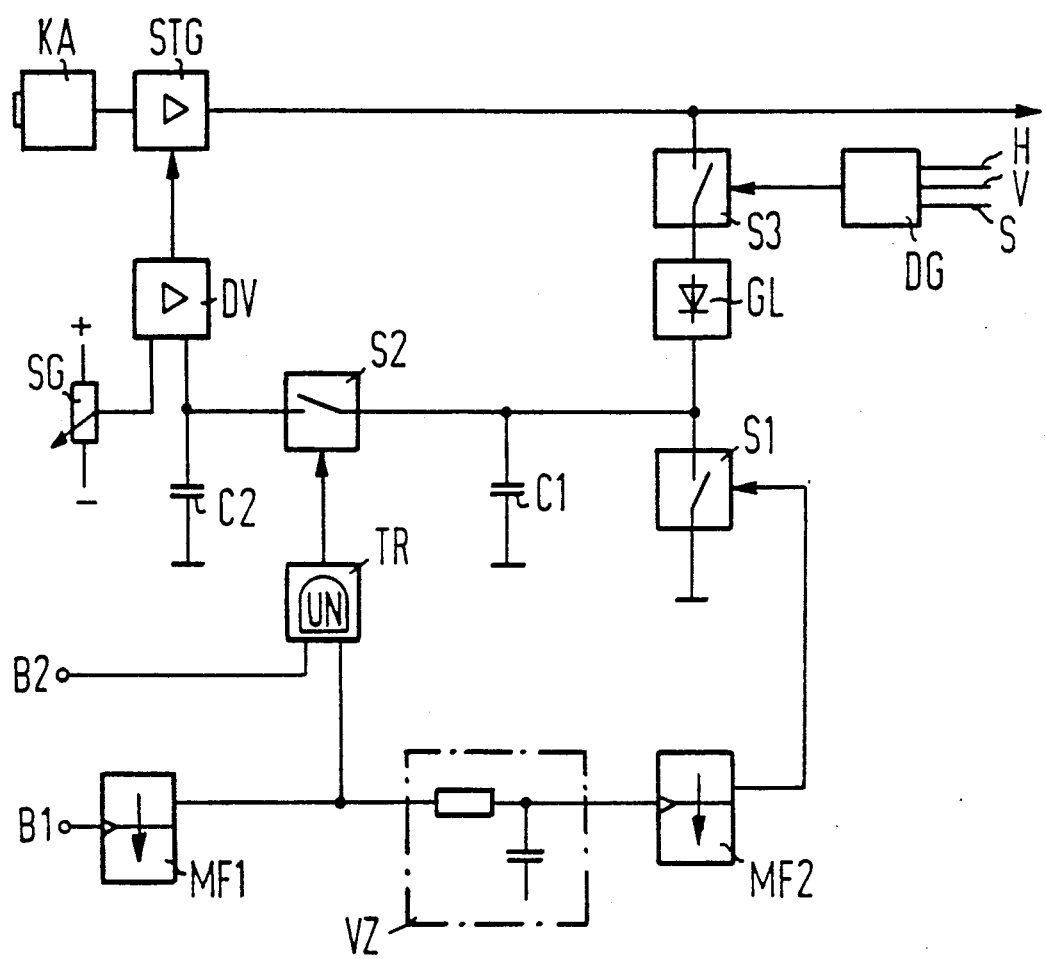

SIGNAL LEVEL CONTROL CIRCUIT HAVING ALTERNATELY SWITCHED CAPACITORS IN THE FEEDBACK BRANCH

FIELD OF THE INVENTION

The invention relates to a circuit for controlling the amplitude of video signals and, more particularly, to the use of a final control element lying in the video signal path and controlled via a controller input derived from the output of the final control element.

BACKGROUND OF THE INVENTION

A circuit including a clamp circuit and a measuring capacitor for automatically setting the black level voltage at the cathode of a picture tube is known from DE-OS 35 35 570. During the time interval which is not utilized for graphic display, the measuring capacitor is charged, at each frame cycle, by the cathode current. The obtained measured value is received by a scanning and holding circuit and is made available to the control circuit for the remaining frame duration. The control circuit supplies the black level voltage at which the cathode potential is brought into contact with the clamp circuit.

In P 38 19 214.4, a circuit is known for setting the mean brightness of a picture represented with a video signal by holding constant the mean value of the video signal. The mean brightness of image fragments are controlled at a setpoint which is independent from the gray scale value of the remaining image. To accomplish this, the video signal and the signal of a setpoint device are each carried through one switch which is closed during the time periods when the video signal of the image fragments appears. The output signals of both switches are supplied via integrators having equal time constants to a controller. The controller output is coupled to the control input of a controllable attenuator lying in the video signal path. A controllable amplifier can also be used in place of the controllable attenuator. A rectifier is arranged upstream of the integrator. Instead of using the mean value of the video signal, the peak value or another value can also be held constant.

Above all, this type of amplitude control is suited for the video recording of continuously illuminated or luminous images. If the images are illuminated in a pulsewise manner, i.e., by light pulses having varying widths and intervals such as in X-ray video monitors, then the video signal amplitude is controlled according to the resulting mean value of the pulse/interval ratio. However, this type of amplitude control is often undesirable.

SUMMARY OF THE INVENTION

The present invention provides a circuit for controlling the amplitude of video signals having a small recovery time constant. Because of the small recovery time constant, the video signal's amplitude generated by recording pulse-shaped, illuminated images, is stabilized.

The amplitude controlling circuit controls video signals output on a video signal path. The video signals provide image frequency pulses during a frame flyback sequence of operation. A first control device is coupled in line with the video signal path and has a video signal output. A second control device provides an actual value of an input signal to the first device. The control input signal is derived from the video signal output. A first capacitor is charged by the video signal. A first switch is coupled in parallel with the first capacitor. A second capacitor has a charging voltage substantially equal to the actual value of the input signal and a second switch coupled between the first and second capacitors. At least two consecutive control pulses are generated from the image frequency pulses, the first of the control pulses closes the second switch while the first switch is open and the second of the control pulses closes the first switch while the second switch is open.

BRIEF DESCRIPTION OF THE DRAWING

The figure is a circuit block diagram of an exemplified embodiment of the invention.

DETAILED DESCRIPTION

In the figure, a video camera KA or another type of signal generator generates video signals which are provided to a final control element STG. In this example, the final control element STG is an amplifier having an amplification factor which is controlled by means of a control voltage provided via a switch S3 controlled with a target sensor DG.

The video signals are supplied via a rectifier GL to a capacitor C1. A switch S1 is connected in parallel with the capacitor C1. The switch S1 is kept open during the frame forward sequence of the video camera KA so that the charging of the capacitor C1 provides a gauge for the amplitude of the video signals at the output of the final control element STG. A switch S2 is closed for a short time period during the frame flyback sequence so that the stored charge in capacitor C1 can flow into a capacitor C2, thereby charging capacitor C2. Once the capacitor C1 is discharged, the switch S1 is closed for a short time period. By means of a differential amplifier DV having a highly resistant input, the voltage at the capacitor C2 is compared with a setpoint value determined by a setpoint device SG. The output signal of the differential amplifier DV controls the attenuation or amplification factor of the final control element STG, and thus the amplitude of the video signals emitted at the final control output for further processing, e.g. representation.

A further circuit includes two monostable elements MF1, MF2 and a time-delay element VZ which serve to control the switches S1 and S2. A pulse is supplied to the circuit via an input B1 during the frame flyback sequence. The pulse sets the monostable element MF1 to an unstable state. The output signal from monostable element MF1 which appears in the unstable state arrives at the control input of the switch S2 via a gate circuit TR. The gate circuit TR can be, for example, an AND-gate UN having a second input which is assumed to be set to enable the gate UN. The switch S2 is therefore closed for the duration of the output pulse of the element MF1 so that the charge of the capacitor C1 can flow into the capacitor C2. The pulse duration can be approximately 0.5 msec. The output pulses of the element MF1 are also supplied to the second monostable element MF2 via a time-delay element VZ. The second monostable element MF2 is switched into its unstable state by the delayed back edge of the output pulse from the time-delay element VZ provided by element MF1. This pulse, which lasts for approximately one millisecond, closes the switch S1 thus discharging the capacitor C1. The delay time of the time-delay element VZ must be long enough so that the second switch S2 is opened prior to the first switch S1 closing to prevent the discharge of C2. The voltage stored at the capacitor C2 thus serves as an actual value for the amplitude control during one frame cycle.

For providing control stability, it is advantageous to dimension the capacitances of the capacitors C1, C2 such that, in case of a brightness variation of the image, the capacitor C2 is not charged via the charging process at the new value, but rather that several charging cycles are required before the upper range value is reached. It is sometimes desirable to turn off the automatic amplification controller. To do so, a blocking signal is supplied to the gate circuit TR via an input B2. This type of blocking signal is also used for video equipment which operate in accordance with an interleaved scanning method to block the gate circuit TR at every other flyback pulse. In this manner, image flickering is prevented which otherwise could appear when the average brightness of both interlaced displays is different. The frequency of the pulses supplied to the input B1 can therefore be equal to the interlaced display or non-interlaced display frequency. An integral multiple of the non-interlaced display frequency is also possible.

The target sensor DG generates control signals for the switch S3 from the horizontal and vertical synchronous pulses H, V as well as from the actuating signals S indicating an image segment. The target sensor DG operates such that the switch S3 is closed during the times when the video signals for the image area specified by the actuating signals are supplied via the final control element STG. If the image area specified by the actuating signals is supposed to be round, then the circuit scanning circuit described in the periodical "Radio Mentor", 1964, pp 714 to 717 can be used in place of the target sensor DG. This circuit transforms a camera's saw-tooth shaped deflection signals into parabolic signals through integration. These parabolic signals are mixed. The signal mixture is supplied to a threshold stage whose threshold value is set by the control signal S and which cuts off the signals which are greater than the threshold value. The signal thus formed is a square-wave signal and is supplied to the switch S3 as a control signal. The switch S1 then is closed to switch the video signals for this image area through. The charge of the capacitor C1 then corresponds only to the average amplitude of this image area in case of averaging. It, therefore, changes with the alteration of the size of the image area.

In order to avoid such an undesirable alteration, an additional switch (not shown), which is connected between the setpoint device SG and the setpoint input of the differential amplifier DV, is actuated by the output signals of the target sensor DG. In the event that the capacitor C1 is charged to the peak value of the image area of interest, this type of a switch is not necessary; i.e., it must remain closed.

What is claimed is:

1. An amplitude controlling circuit for video signals output on a video signal path, the video signals providing image frequency pulses during a frame flyback sequence, comprising:
   (a) a first control device coupled in line with the video signal path and having a video signal output;
   (b) a second control device providing an actual value of an input signal to said first device, the input signal being derived from the video signal output;
   (c) a first capacitor charged by the video signal;
   (d) a first switch coupled in parallel with the first capacitor;
   (e) a second capacitor having a charging voltage substantially equal to the actual value of the input signal;
   (f) a second switch coupled in series between the first and second capacitors wherein at least two consecutive control pulses are generated from the image frequency pulses, the first of said control pulses closing the second switch while the first switch is open and the second of said control pulses closing the first switch while the second switch is open.

2. The circuit according to claim 1, further comprising:
   a first monostable element having an input which receives the image frequency pulses and an output which provides a control input for the second switch;
   a time delay element receiving the image frequency pulses from the first monostable element; and
   a second monostable element receiving the image frequency pulses from the time delay element and providing an output to a control input of the first switch.

3. The circuit according to claim 2, wherein a gate circuit has a first input coupled to the output of the first monostable element and a second input which receives a control signal supplied to block the signals of the first monostable element, the gate circuit being arranged to provide the control input for the second switch.

4. The circuit according to claim 3, further comprising video equipment operating in an interleaved scanning according to the manner and generating image frequency pulses including frame flyback pulses or pulses derived therfrom; the control signal of the gate circuit operating to block every other pulse generated by the first monostable element.

* * * * *